US012769864B2

(12) United States Patent
Wake et al.

(10) Patent No.: US 12,769,864 B2
(45) Date of Patent: Oct. 20, 2026

(54) SYSTEMS AND METHODS FOR PROCESSING A NATURAL LANGUAGE QUERY

(71) Applicant: Rocket Software, Inc., Waltham, MA (US)

(72) Inventors: Timothy Wake, Waltham, MA (US); Robert Russell, New Canaan, CT (US); Vikas Mehra, Waltham, MA (US); Sudhi Balan, Fairfield, CT (US)

(73) Assignee: Rocket Software, Inc., Waltham, MA (US)

( * ) Notice: Subject to any disclaimer, the term of this patent is extended or adjusted under 35 U.S.C. 154(b) by 0 days.

(21) Appl. No.: 18/987,275

(22) Filed: Dec. 19, 2024

(65) Prior Publication Data

US 2026/0050681 A1 Feb. 19, 2026

Related U.S. Application Data

(60) Provisional application No. 63/683,546, filed on Aug. 15, 2024.

(51) Int. Cl.
*G06F 21/62* (2013.01)

(52) U.S. Cl.
CPC ................................ *G06F 21/6218* (2013.01)

(58) Field of Classification Search
CPC .................................................. G06F 21/6218
See application file for complete search history.

(56) References Cited

U.S. PATENT DOCUMENTS

| | | | |
|---|---|---|---|
| 11,947,915 B1 | 4/2024 | Shen et al. | |
| 2010/0293174 A1 | 11/2010 | Bennett et al. | |
| 2015/0052157 A1 | 2/2015 | Thompson | |
| 2017/0054724 A1 | 2/2017 | Maple et al. | |
| 2020/0117740 A1* | 4/2020 | Schmidt .............. | G06F 16/9535 |
| 2022/0083549 A1 | 3/2022 | Wiegand et al. | |

(Continued)

OTHER PUBLICATIONS

Abdullah Alamri • Peter Bertok • James A. Thom; Authorization Control for a Semantic Data Repository through an Inference Policy Engine; IEEE Transactions on Dependable and Secure Computing (vol. 10, Issue: 6, 2013, pp. 328-340); (Year: 2013).*

(Continued)

*Primary Examiner* — Luu T Pham
*Assistant Examiner* — Chao Wang
(74) *Attorney, Agent, or Firm* — Danielson Legal LLC

(57) ABSTRACT

Systems and methods for processing a natural language query. The system includes at least one database storing a plurality of documents; an interface for receiving a natural language query from a user; and one or more processors executing instructions stored on memory and configured to reference at least one policy associated with the user, wherein the at least one policy defines a permission for the user with respect to accessing the plurality of documents, restrict access to a first subset of the plurality of documents based on the policy associated with the user such that only a second subset of the plurality of documents can be referenced to generate a response to the query, and reference the second subset of the plurality of documents to generate the response to the natural language query, wherein the interface is further configured to present the generated response to the user.

16 Claims, 5 Drawing Sheets

(56) References Cited

U.S. PATENT DOCUMENTS

2024/0086566 A1* 3/2024 Lim .................. G06F 16/24553
2025/0291827 A1* 9/2025 Chong ................ G06F 16/3329

OTHER PUBLICATIONS

Yuan Chang • Siran Wang • Tom H. Luan • Yuntao Wang • Zhou Su; PrivRAG: A Privacy-Preserving Retrieval-Augmented Generation Protocol for LLM-Driven Voice Assistants; 2025 IEEE 24th International Conference on Trust, Security and Privacy in Computing and Communications (TrustCom) (2025, Page(s); (Year: 2025).*

Eeshan Gupta • Shamik Sural • Jaideep Vaidya • Vijayalakshmi Atluri; Enabling Attribute-Based Access Control in NoSQL Databases; IEEE Transactions on Emerging Topics in Computing (vol. 11, Issue: 1, 2023, pp. 208-223); (Year: 2022).*

International Search Report for PCT/US2025/040530, Sep. 22, 2025. (3 pages).

Written Opinion for PCT/US/2025/040530, Sep. 22, 2025. (10 pages).

* cited by examiner

SYSTEMS AND METHODS FOR PROCESSING A NATURAL LANGUAGE QUERY

CROSS REFERENCE TO RELATED APPLICATIONS

The present application claims the benefit of and priority to U.S. provisional application No. 63/683,546, filed on Aug. 15, 2024, the content of which is hereby incorporated by reference as if set forth in its entirety herein.

TECHNICAL FIELD

Embodiments described herein generally relate to systems and methods for processing natural language queries and, more particularly but not exclusively, to systems and methods for generating a response to natural language queries.

BACKGROUND

Generative artificial intelligence (AI) has led to the advancement of tools that rely on deep learning for providing content for users. These tools can use models such as neural networks to not only understand textual prompts or queries, but to also generate responses thereto.

Chat tools can receive a textual prompt such as a question from a user and generate a textual response for the user. Generating these tools may involve labeling data, training a model on the labeled data, verifying the model, and using software to apply the model to the textual prompt.

These existing tools generally require the removal of content from a governed space and consolidated into a single location for analysis for generating a response. However, this requires the disruption of existing data flows.

A need exists, therefore, for systems and methods that overcome the disadvantages associated with existing streaming techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments relate to a system for processing a natural language query. The system includes at least one database storing a plurality of documents; an interface for receiving a natural language query from a user; and one or more processors executing instructions stored on memory and configured to reference at least one policy associated with the user, wherein the at least one policy defines a permission for the user with respect to accessing the plurality of documents, restrict access to a first subset of the plurality of documents based on the policy associated with the user such that only a second subset of the plurality of documents can be referenced to generate a response to the query, and reference the second subset of the plurality of documents to generate the response to the natural language query, wherein the interface is further configured to present the generated response to the user.

In some embodiments, the interface is further configured to receive a user selection of at least one document of the plurality of documents, and the one or more processors are further configured to restrict access to a portion of the user selection based on the policy associated with the user.

In some embodiments, the method further includes receiving from the user a selection of at least one document to transfer to the database. In some embodiments, the method further includes vectorizing the selected at least one document.

In some embodiments, the one or more processors restrict access to the first subset of the plurality of documents by redacting a portion of a document of the plurality of documents.

In some embodiments, the one or more processors restrict access to the first subset of the plurality of documents by restricting access to metadata associated with a portion of the plurality of documents.

In some embodiments, the one or more processors are further configured to vectorize an unvectorized document of the plurality of documents in response to receiving the natural language query.

In some embodiments, the second subset of the plurality of documents includes a vectorized portion and a text-based portion.

In some embodiments, the one or more processors are further configured to assign a classification to the natural language query and the second subset is based on the assigned classification.

In some embodiments, the at least one policy is a uniform policy applicable to a plurality of users.

According to another aspect, embodiments relate to a method for processing a natural language query. The method includes receiving at an interface a natural language query from a user; referencing, using one or more processors executing instructions stored on memory, at least one policy associated with the user, wherein the at least one policy defines a permission for the user with respect to accessing a plurality of documents stored in a database; restricting access to a first subset of the plurality of documents based on the policy associated with the user such that only a second subset of the plurality of documents can be referenced to generate a response to the natural language query; referencing the second subset of the plurality of documents to generate the response to the natural language query; and presenting via the interface the generated response to the user.

In some embodiments, the method further includes receiving via the interface a user selection of at least one document of the plurality of documents, and restricting, using the one or more processors, access to a portion of the user selection based on the policy associated with the user. In some embodiments, the method further includes vectorizing the at least one selected document.

In some embodiments, restricting access to the first subset of the plurality of documents includes redacting a portion of a document of the plurality of documents.

In some embodiments, restricting access to the first subset of the plurality of documents includes restricting access to metadata associated with the first subset of the plurality of documents.

In some embodiments, the method further includes vectorizing an unvectorized document of the plurality of documents in response to receiving the natural language.

In some embodiments, the second subset of the plurality of documents includes a vectorized portion and a text-based portion.

In some embodiments, the method further includes assigning a classification to the natural language query, wherein the second subset is based on the assigned classification.

In some embodiments, the at least one policy is a uniform policy applicable to a plurality of users.

According to yet another aspect, embodiments relate to a computer program product for processing a natural language query. The computer program product comprising computer executable code embodied in one or more non-transitory computer readable media that, when executing on one or more processors, performs the steps of referencing, using one or more processors executing instructions stored on memory, at least one policy associated with the user, wherein the at least one policy defines a permission for the user with respect to accessing a plurality of documents stored in a database; restricting access to a first subset of the plurality of documents based on the policy associated with the user such that only a second subset of the plurality of documents can be referenced to generate a response to the natural language query; referencing the second subset of the plurality of documents to generate the response to the natural language query; presenting via the interface the generated response to the user.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
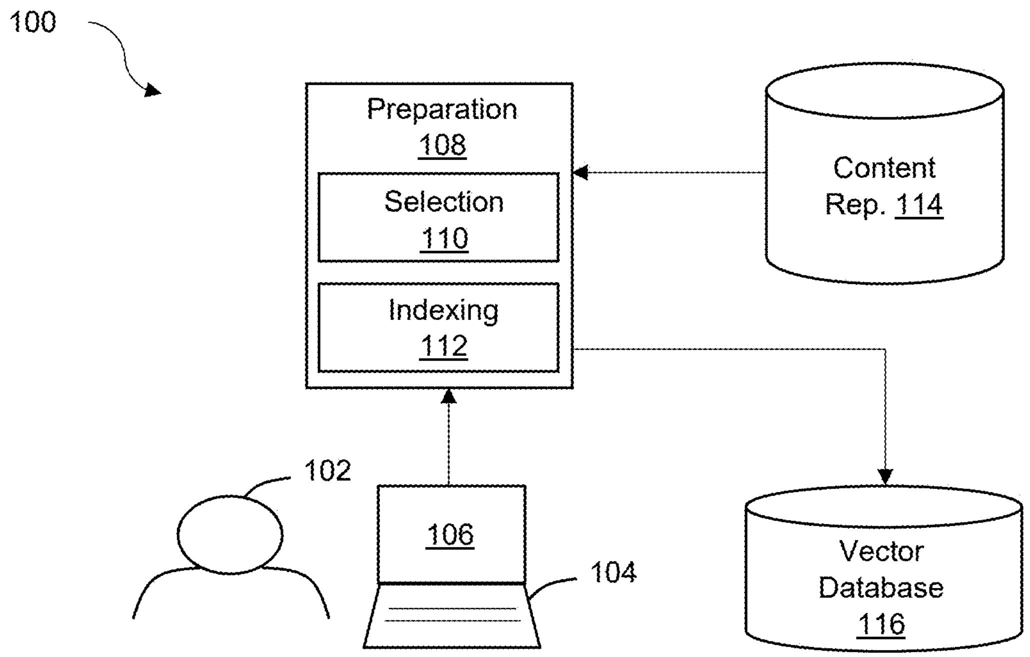
FIG. 1 illustrates a process for indexing at least one document of a plurality of documents in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to “one embodiment” or to “an embodiment” means that a particular feature, structure, or characteristic described in connection with the embodiments is included in at least one example implementation or technique in accordance with the present disclosure. The appearances of the phrase “in one embodiment” in various places in the specification are not necessarily all referring to the same embodiment. The appearances of the phrase “in some embodiments” in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as “processing” or “computing” or “calculating” or “determining” or “displaying” or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

As discussed above, existing chat tools generally require the removal of content from a governed space, and the consolidation of the content into a single location for analysis. This requires the disruption of existing data flows, which may slow response times and inconvenience personnel providing a query.

The embodiments herein provide novel techniques for processing a natural language query. The disclosed systems and methods enable a high level of control over what content is available for analysis to generate a response to the query. These access controls may be based on, for example, the user (e.g., the individual providing the natural language query), the subject of the natural language query, permission levels of the user, the location of the user, user title, user group, policies in place for handling content, or the like.

The embodiments herein may separate content (e.g., documents) into a first subset of documents and a second subset of documents. In the context of the present application, the "first subset of documents" may refer to documents or portions thereof that are restricted from being used to generate a response to a query due to one or more access policies. The "second subset of documents" may refer to documents or portions thereof that are not included in the first subset of documents or are otherwise accessible for use in generating a response to a query. The second subset of documents may include documents or portions thereof that have been vectorized, documents or portions thereof that have not been vectorized (e.g., are in text), or some combination thereof.

The systems and methods herein may only analyze the second subset of documents to generate a response to a natural language query. Accordingly, content such as documents need not be removed from a governed space and placed at a specific location. This preserves computing resources and does not disrupt existing workflows.

FIG. 1 illustrates a process for indexing at least one document of a plurality of documents in accordance with one embodiment. An administrator 102 may be tasked with deciding which content to provide to an index for subsequent analysis. The administrator 102 may access a user device 104 executing a user interface 106 to select new or existing content. The user device 104 may include or otherwise be in communication with a preparation module 108 executing a selection submodule 110 and an indexing submodule 112. The selection submodule 110 may allow the administrator 102 to select content that matches certain criteria, or to select content that belongs to a particular class of content (e.g., invoices, human resource documents, etc.).

This content may be stored in and retrievable from one or more content repositories 114. The content repository(ies) 114 may store documents associated with an entity such as a business entity, government entity, academic institution, etc. The stored documents may vary and may depend on the type of entity, but may include documents associated with a customer base, auditing documents, finance documents, employment records, or any other type of documentation associated with the operation of the applicable entity.

The indexing submodule 112 may perform any appropriate vectorization procedures on the selected content, and store the vector representations in the vector database 116. The embodiments herein may implement one or more of a variety of techniques for the structured data handling of the documents during indexing. During indexing, the indexing submodule 112 may extract and represent tabular data as metadata using a variety of heuristic archiving and extraction policies. For example, the indexing submodule 112 may represent tabular data as plain text for BNM 25 content retrieval, or represent tabular data in a semantic vector index. These indexes can be used in combination to identify relevant content when responding to queries.

The embodiments herein may update the vector database 116 in at least substantially real time. For example, indexes in the vector database 116 may be updated in response to content lifecycle events in the repository 114. These events may include, but are not limited to, the ingestion of new content; removal of existing content; or the alternation of existing content in response to changes to content retention policies, manual administrative actions, removal of legal-related restrictions, or the like. If a piece of content is removed from the content repository(ies) 114, the indexing submodule 112 may automatically remove the corresponding document from the vector database 116.

Figure 2:
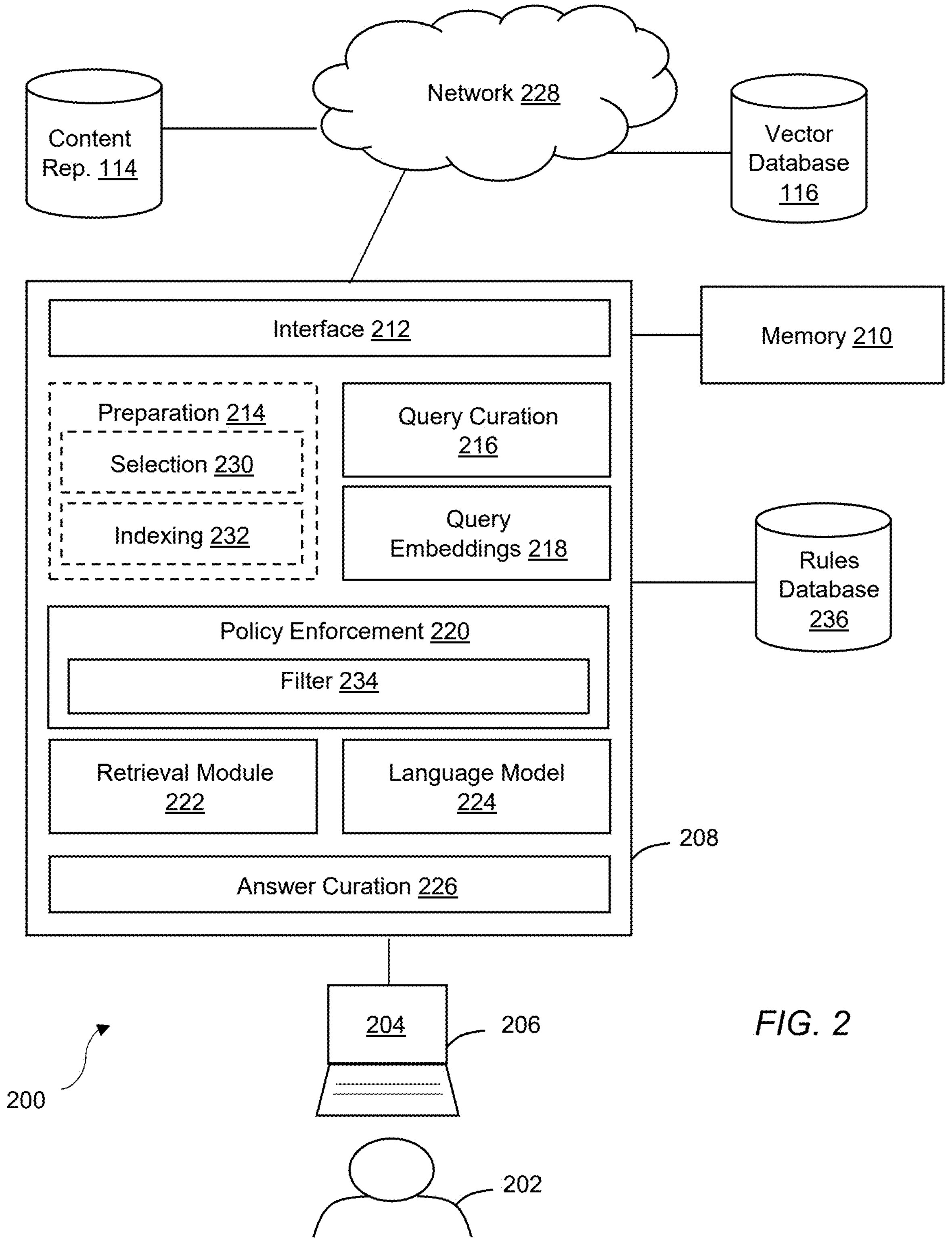
FIG. 2 illustrates a system for processing a natural language query in accordance with one embodiment.

FIG. 2 illustrates a system 200 for processing a natural language query in accordance with one embodiment. A user 202 may access a user interface 204 executing on a user device 206. The user 202 may be interested with providing a natural language query regarding one more documents stored in the content repository 114 or the vector database 116 of FIG. 1.

The user device 206 may be any suitable hardware device configured to execute the user interface 204 to accomplish the features of the described embodiments. For example, the user device 206 may be a personal computer (PC), laptop, smartphone, tablet, or any other device whether available now or invented hereafter.

The user interface 204 may allow the user 202 to provide a natural language query. The user 202 may provide the natural language query via any suitable input/output (I/O) device, such as a keyboard, touchscreen, microphone, or the like.

Additionally, the user interface 204 may allow the user 202 to select documents for analysis in generating a response to the natural language query. For example, the user 202 may select only the three most recent bank statements (as opposed to all bank statements) of a particular customer in determining the user's credit risk. The user interface 204 may also present to the user 202 a response to the provided natural language query.

The user device 206 may include or otherwise be in operable connectivity with one or more processors 208. The processor(s) 208 may be any hardware device capable of executing instructions stored on memory 210 to provide various components or modules. The processor 208 may include a microprocessor, a field programmable gate array (FPGA), an application-specific integrated circuit (ASIC), or other similar devices.

In some embodiments, such as those relying on one or more ASICs, the functionality described as being provided in part via software may instead be configured into the design of the ASICs and, as such, the associated software may be omitted. The processor 208 may be configured as part of the user device 206 (e.g., a laptop) or located at some remote location.

The memory 210 may be L1, L2, L3 cache, or RAM memory configurations. The memory 210 may include non-volatile memory such as flash memory, EPROM, EEPROM, ROM, and PROM, or volatile memory such as static or dynamic RAM, as discussed above. The exact configuration/ type of memory 210 may of course vary as long as instructions for processing a natural language query can be performed by the system 200. For example, the processor(s) 208 may include or otherwise execute various components such as interface 212, data preparation module 214, query curation module 216, query embeddings module 218, policy enforcement module 220, a retrieval module 222, language model 224, and answer curation module 226.

The processors(s) 208 may receive data from and communicate data across one or more networks 228. The network(s) 228 may link the various components with various types of network connections. The network(s) 228 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34b is analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network or networks 228 may also comprise, include, or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link. The processor(s) 208 may be in communication over the network(s) 228 with the content repository(ies) 114 and vector database 116 of FIG. 1.

The preparation module 214 may allow the user 202 to perform the data preparation steps of FIG. 1 outlined above. The preparation module 214 may be similar to the preparation module 108 of FIG. 1. Similarly, the selection submodule 230 and the indexing submodule 232 may be similar to the selection submodule 110 and the indexing submodule 112, respectively, of FIG. 1. In other words, the components that perform the data preparation steps of FIG. 1 may be co-located with the components of the system 200 or at location remote from system 200.

The administrator 102 performing the data preparation steps of FIG. 1 may be the same or different than the user shown in FIG. 2. In other words, the user 202 may only be tasked with providing a natural language query, and not performing any of the above-discussed data preparation steps.

The query curation module 216 may perform an initial assessment on whether the system 200 can provide a response to a received natural language query. The query curation module 216 may analyze the query and evaluate the query with respect to the available documents. If a query involves financial documents associated with a particular customer, the query curation module 216 may inspect whether there are even any available documents associated with the customer. If the system 200 does not have access to any documents associated with the customer, the query curation module 216 may instruct the interface 212 to present a message to inform the user 202 that the system 200 is unable to generate a response to the query.

As another example, a query may relate to or otherwise require the aggregation of hundreds or thousands of documents. In this case, depending on the computing resources available, the embodiments herein may inform the user 202 that it will not be able to analyze this large of an amount of documents. The system may return a message instructing the user 202 to narrow the amount of documents selected for responding to the query. In some embodiments, the system 200 may return a response with a disclaimer informing the user that the response may not be entirely accurate or inform the user of any caveats regarding the generated response.

The query embeddings module 218 may perform any appropriate embedding steps regarding the received natural language query. Specifically, the query embeddings module 218 may transform letters, words, or phrases associated with queries into vectors. In some embodiments, these may include vectors of floating point numbers.

The query embeddings module 218 may embed at various levels, such as by embedding words, sentences, phrases, or entire documents. The query embeddings module 218 may execute techniques such as Word2Vec, FastText, Universal Sentence Encoder (USE) Doc2Vec, or any other technique whether available now or invented hereafter.

The query embeddings module 218 may compare vector (s) associated with the natural language query with vector(s) associated with the stored documents or portions thereof. Text of documents pertaining to a certain topic should have similar vectors as vectors associated with a natural language query about the same topic.

In some embodiments, the system 200 may implement access-control policies. These policies may be based on several contextual facets, either singularly or on combination. These may include, but are not limited to, the user, a user group membership, the content repository(ies), time of day, geo-location, individual content items, attributes of selected content items, age of the content items, content of the user queries, or the like.

The policy enforcement module 220 may implement policies to define which document(s) may or may not be used for generating a response to the query. In some embodiments, the policy enforcement module 220 implements a filter 234 to block or allow certain data from being analyzed as part of the query generation process. For example, the filter 234 may be configured to block documents that have certain metadata. In some embodiments, the filter 234 may be a plain text filter that filters documents or portions thereof based on their text. In some embodiments, the filter 234 may be configured as an APACHE LUCENE® filter.

The policy enforcement module 220 may reference rules stored in one or more rules databases 236. These rules may be based on one or more of a variety of criteria. In some embodiments, the policy enforcement module 220 may restrict access to documents or portions thereof based on the user 202 and, in particular, their seniority, title, security clearance, authorizations, or the like. In some embodiments, the policy enforcement module 220 may restrict access to documents or portions thereof based on the document content. For example, the policy enforcement module 220 may by default prevent access to or otherwise not use certain banking activity associated with a customer in generating a response.

In some embodiments, the policy enforcement module 220 may by default prevent access to documents or portions thereof from a particular source. The above list is only exemplary, and the policy enforcement module 220 may implement rules or policies based on other type of criteria in addition to or in lieu of those mentioned above.

In some embodiments, the rules database(s) 236 may provide a knowledge base by indexing additional contextual information. This may allow the system 200 to improve the generated answers by augmenting indexed content with a knowledge base of core knowledge about specific topics. When a question is identified and classified as benefitting from a knowledge base, that content may be considered when answering a related question.

As discussed previously, a first subset of documents may refer to documents or portions thereof that are restricted from being used to generate a response to a query due to one or more access policies. A second subset of documents may refer to documents or portions thereof that are not included in the first subset of documents or are otherwise accessible and able to be used in generating a response to a query. The second subset of documents may include documents or portions thereof that have been vectorized, documents or portions thereof that have not been vectorized (e.g., are in text), or some combination thereof. Accordingly, the retrieval module 222 may search the vector database 116 or repository(ies) 114 for content that is available for generating a response to a query.

The retrieval module 222 may retrieve the relevant second subset of documents or portion(s) thereof for generating a response to the natural language query. Specifically, since the policy enforcement module 220 may prevent access to a first subset of documents, the retrieval module 222 may retrieve only a second subset of documents.

The retrieval module 222 may perform one or more of a variety of techniques for retrieving content. These may include, but are not limited to, fuzzy matching, word proximity search, Term Frequency-Inverse Document Frequency (TF-IDF), keyword searching, semantic searching, Best Matching 25 (BM25), knowledge graph-based retrieval, concept-based retrieval, context-aware retrieval, or any other technique whether available now or developed hereafter.

The type of returned content may vary and may depend on the natural language query and the relevant policies. For example, if a query relates to a patient's medical history, retrieved documentation may include data regarding previous diagnoses and test results.

Figure 3A:
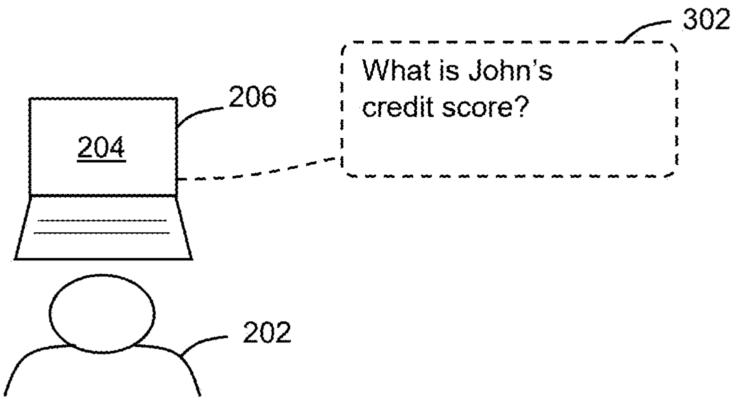
FIGS. 3A-3D illustrate a process for generating a response to a natural language query in accordance with one embodiment.

As another example, a query may relate to a customer's credit score of. FIG. 3A illustrates a natural language query 302 regarding a customer such a bank customer ("John"). In this case the user 202 providing the query may be a bank representative tasked with deciding whether to give John a loan, of what amount, at what interest rate, etc. Accordingly, and as seen in FIG. 3A, the natural language query 302 is "What is John's credit score?"

Figure 3B:
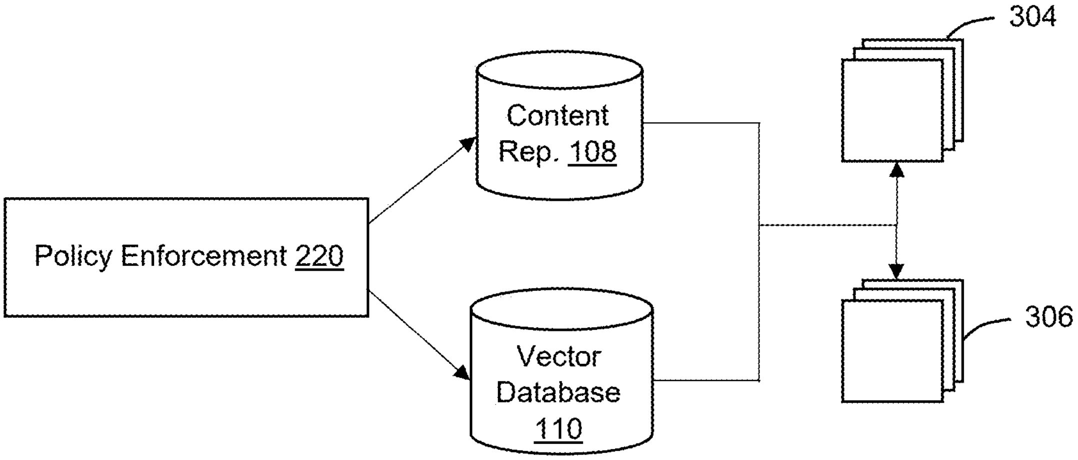

FIG. 3B illustrates the policy enforcement module 220 analyzing documents stored in the content repository 114 and the vector database 116. Depending on applicable policies, these documents may be sorted into the first set of documents 304 and the second set of documents 306. The embodiments herein may implement one or more handling techniques for structured or (e.g., tabular) data in answering queries. When a user asks a question that can be answered using structured data, all indexed tabular data represented as text and as metadata may be considered in generating an answer.

Figure 3C:
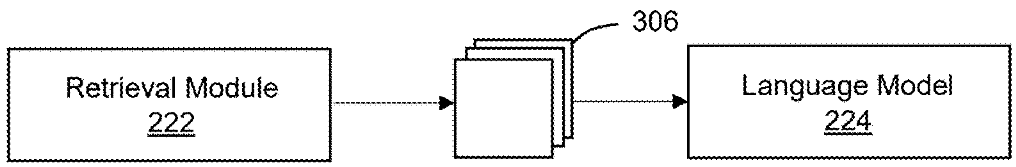

In FIG. 3C, the retrieval module 222 may pass along the second subset of documents 306 to the language model 224. The language model 224 may leverage machine learning techniques including deep learning to understand and use the content of the second subset of documents 306 in generating a response to the query 302. The language model 224 may rely on neural networks to analyze text to capture contextual relationships between words and generate natural language responses. For example, the language model may tokenize the natural language query, process the tokens through layers of one or more neural networks, apply weights to the tokenized components, and generate a natural language response. The exact processes implemented by the language model may vary.

The answer curation module 226 of FIG. 2 may present the generated natural language response to the user 202 via the user interface 204. Additionally, the answer curation module 226 may present to the user 202 the document(s) that were used to generate the response. The user 202 may be presented with an option to view the documents that were used.

In some embodiments, the answer curation module 226 may determine which documents are used frequently to generate a response, which documents are rarely used to generate a response, which documents are relied on more heavily in a generating response, etc. In some embodiments, documents that are rarely used in generating a response may be removed from the vector database 116. The embodiments herein may also perform multiple iterations on the second subset of documents 306 to determine whether a generated response changes due to the removal of content from the second subset of documents 306. If the response does not change, then the answer curation module 226 can determine that the removed content was not used or is otherwise not necessary.

The answer curation module 226 may also allow the user 202 to provide feedback regarding the generated response. For example, the user may provide a follow-up question, or also ask the same or similar question, but for the system 200 to use a different group of content to generate a response.

Figure 3D:
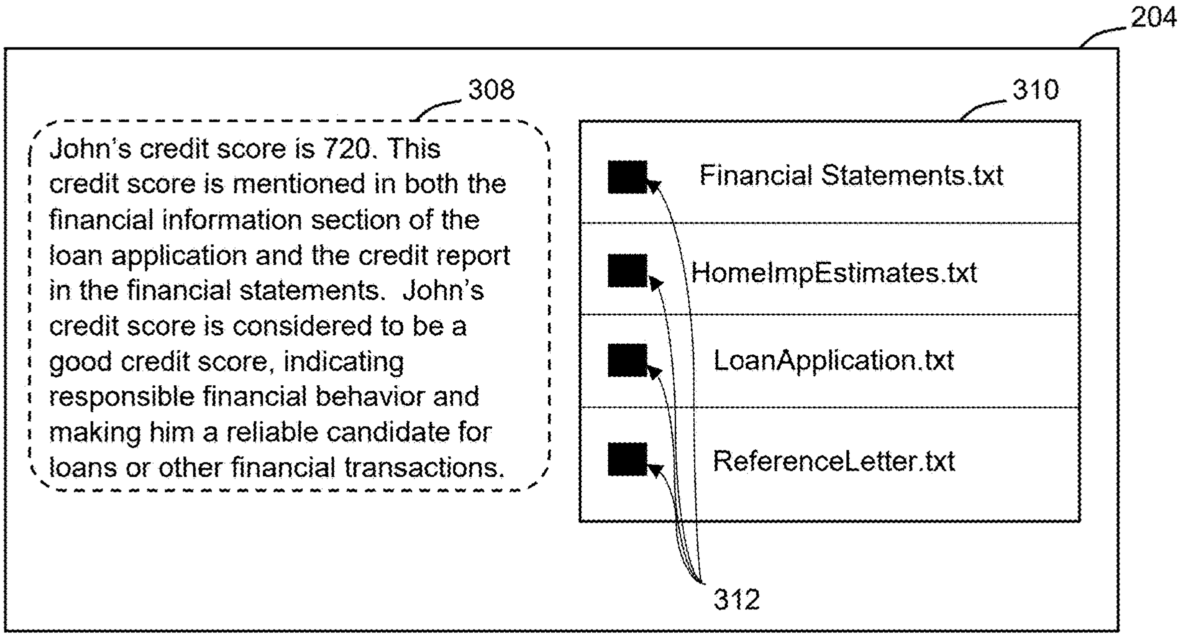

FIG. 3D illustrates the user interface 204 presenting a natural language response 308. Specifically, the response 308 provides John's credit score an explanation of the credit score. The user interface 204 also includes a documents pane 310 to show the documents that were analyzed to generate the response 308.

The four documents listed in the documents pane 310 may have been previously selected by the user 202. That is, the user 202 may have wanted the system 200 to analyze these four documents to determine John's credit score. Alternatively, the user 202 may have not selected any documents, and the retrieval module 222 may have determined that the four documents in the documents pane 310 are the most relevant for generating a response to the natural language query 302.

The documents pane 310 may include some type of user indicia 312 (illustrated as selected boxes) to allow the user to, for example, remove a document from consideration. The user may activate (e.g., "uncheck") an indicia 312 associated with a document. For example, the user may un-select the box associated with the LoanApplication.txt. document. The above-described analysis described may be repeated, but without analyzing the content of the LoanApplication.txt. document. The generated response may be different than the response generated when all four documents in the documents pane 310 are analyzed. Alternatively, the generated response may be the same as when all four documents in the document pane 310 are analyzed. In the latter case, the LoanApplication.txt may be considered as not relevant for determining John's credit score. For future queries, the LoanApplication.txt. document may be omitted from analysis, thereby preserving computing resources.

Figure 4:
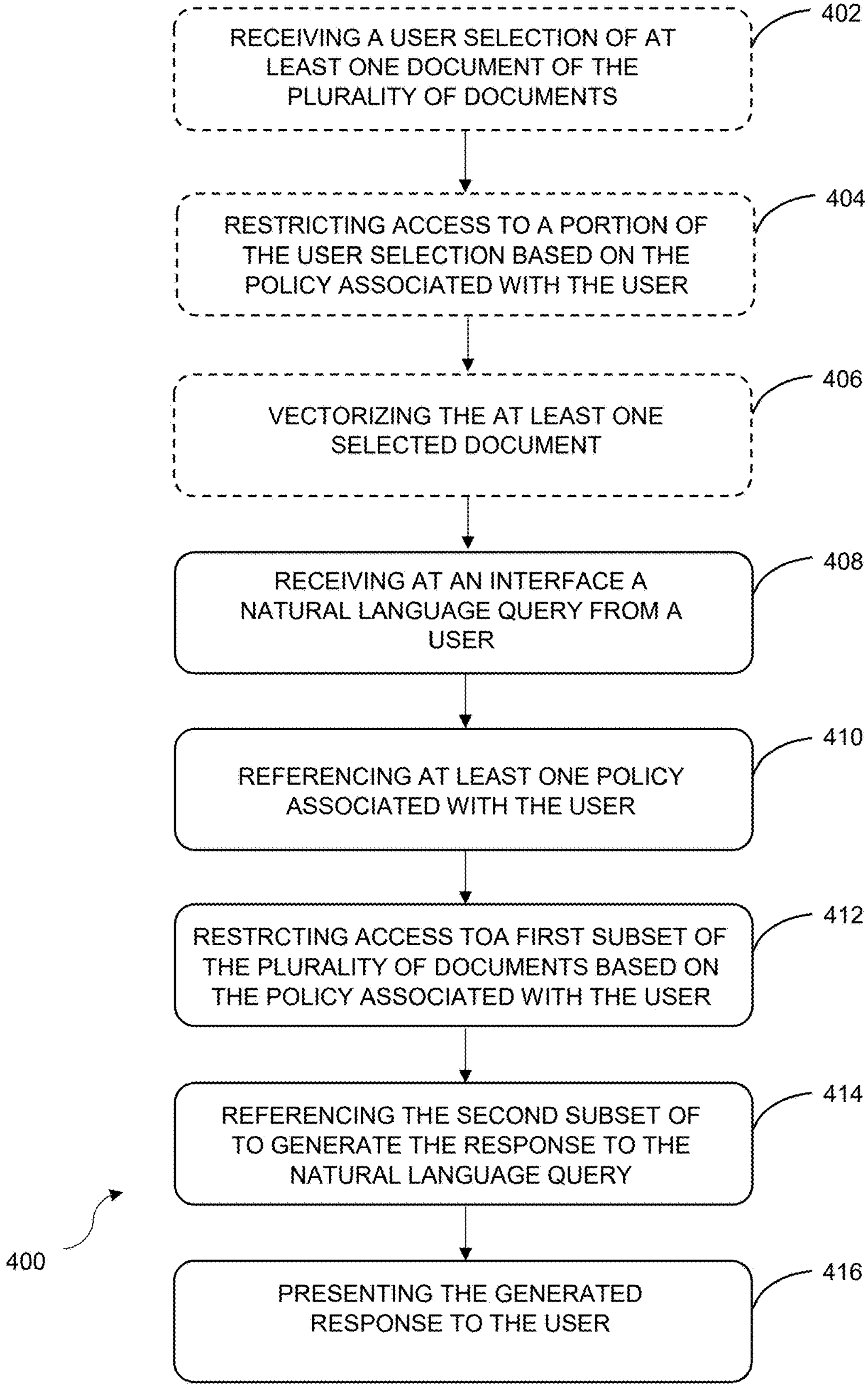
FIG. 4 depicts a flowchart of a method for processing a natural language query in accordance with one embodiment.

FIG. 4 depicts a flowchart of a method 400 for processing a natural language query in accordance with one embodiment. The method 400 may be performed by one or more of the components of FIGS. 1 and 2, for example.

Step 402 is optional and involves receiving a user selection of at least one document of a plurality of documents. A user such as an administrator may review available documents associated with one or more customers, clients, or the like. These documents may be stored in one or more databases and the content thereof may depend on the application. In the example illustrated in conjunction with FIGS. 3A-D, these documents may relate to finances of a bank customer. The user may select which documents are relevant for responding to queries associated with the customer's finances.

Step 404 is optional and involves restricting, using the one or more processors, access to a portion of the user selection based on the policy associated with the user. The preparation module 108 of FIG. 1 may then reference one or more policies associated with one or more users. In some embodiments, there may be policies that are applicable for all multiple users or customers.

For example, data regarding the polices of a user, such as the user's permissions, may be stored in one or more databases. In some embodiments, the user may be restricted from accessing data regarding a customer's brokerage account. In this case, data regarding the customer's brokerage account(s), such as amounts in the account(s) or the numbers associated with the account(s), may be redacted or otherwise blocked.

Step 406 involves vectorizing the at least one selected document. The system 200 may perform any appropriate embedding procedure(s) on the accessible or otherwise unrestricted content. The embodiments herein may vectorize content of one or more documents after a user selects them as in step 402 above.

Accordingly, an administrator or user can choose which document(s) or portions thereof to vectorize. As discussed previously in conjunction with FIGS. 1 and 2, a user may not choose to vectorize all available documents. A user submitting a query would not know, just by looking at a document, whether the document has been vectorized. Accordingly, not all documents in a repository may be vectorized at the time a user submits a query.

Accordingly, the embodiments herein may vectorize a portion of content (e.g., a portion of the second subset of documents) after a user has submitted a query. That is, a user may submit a query for which the answer or evidence supporting the answer are in unvectorized documents. In this situation, the embodiments herein may vectorize the unvectorized portion of the document(s) to assist in generating a response. However, in some embodiments, the user interface 204 may allow a user to see which items of content have already been vectorized.

Step 408 involves receiving at an interface a natural language query from a user. This user may be the same or different user referred to in conjunction with steps 402-406 above.

Step 410 involves referencing, using one or more processors executing instructions stored on memory, at least one policy associated with the user, wherein the at least one policy defines a permission for the user with respect to accessing a plurality of documents stored in a database. As discussed previously, there may be one or more policies associated with the user that control what the system 200 can access in generating a response to the natural language query.

Step 412 involves restricting access to a first subset of the plurality of documents based on the policy associated with the user such that only a second subset of the plurality of documents can be referenced to generate a response to the natural language query. These policies may instruct the system to redact certain parts of a document, metadata associated with a document or some combination thereof. In some embodiments, the policy enforcement module 220 of FIG. 2 may implement a filter 234 to block or allow certain data associated with the plurality of documents.

Step 414 involves referencing the second subset of the plurality of documents to generate the response to the natural language query. The embodiments herein may implement one or more of a variety of machine learning techniques for analyzing the content of the second subset of documents for generating a response to the natural language query.

Step 416 involves presenting via the interface the generated response to the user. As discussed previously, this is a natural language response, which may include reasoning that supports the generated response.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A system for processing a natural language query, the system comprising:

at least one database storing a plurality of documents;

an interface for:

receiving a natural language query from a user, and presenting a selectable visual representation to allow the user to select at least one document of a plurality of documents, and receiving an input from the user to select at least one document of the plurality of documents, wherein the input comprises activation of the at least one selectable visual representation; and one or more processors executing instructions stored on memory and configured to:

reference at least one policy associated with the user, wherein the at least one policy defines a permission for the user with respect to accessing the plurality of documents, restrict access to a first subset of the plurality of documents based on the policy associated with the user and the user selection of the at least one document such that only a second subset of the plurality of documents can be referenced to generate a response to the query, wherein restricting access to the first subset of the plurality of documents further includes restricting access to metadata associated with a portion of the plurality of documents, and reference the second subset of the plurality of documents to generate the response to the natural language query, wherein the interface is further configured to present the generated response to the user.

2. The system of claim 1 further comprising vectorizing the selected at least one document.

3. The system of claim 1 wherein the one or more processors are further configured to vectorize an unvectorized document of the plurality of documents in response to receiving the natural language query.

4. A method for processing a natural language query, the method comprising:

receiving at an interface a natural language query from a user, presenting a selectable visual representation to allow the user to select at least one document of a plurality of documents, and receiving an input from the user to select at least one document of the plurality of documents, wherein the input comprises activation of the at least one selectable visual representation;

referencing, using one or more processors executing instructions stored on memory, at least one policy associated with the user, wherein the at least one policy defines a permission for the user with respect to accessing a plurality of documents stored in a database;

restricting access to a first subset of the plurality of documents based on the policy associated with the user and the user selection of the at least one document such that only a second subset of the plurality of documents can be referenced to generate a response to the natural language query, wherein restricting access to the first subset of the plurality of documents further includes restricting access to metadata associated a portion of the plurality of documents;

referencing the second subset of the plurality of documents to generate the response to the natural language query; and presenting via the interface the generated response to the user.

5. The method of claim 4 further comprising vectorizing the at least one selected document.

6. The method of claim 4 further comprising vectorizing an unvectorized document of the plurality of documents in response to receiving the natural language query.

7. The system of claim 1 wherein the one or more processors restrict access to the first subset of the plurality of documents by redacting a portion of a document of the plurality of documents.

8. The system of claim 1 wherein the second subset of the plurality of documents includes a vectorized portion and a text-based portion.

9. The system of claim 1 wherein the one or more processors are further configured to assign a classification to the natural language query and the second subset is based on the assigned classification.

10. The system of claim 1 wherein the at least one policy is a uniform policy applicable to a plurality of users.

11. The method of claim 4 wherein restricting access to the first subset of the plurality of documents includes redacting a portion of a document of the plurality of documents.

12. The method of claim 4 wherein the second subset of the plurality of documents includes a vectorized portion and a text-based portion.

13. The method of claim 4 further comprising assigning a classification to the natural language query, wherein the second subset is based on the assigned classification.

14. The method of claim 4 wherein the at least one policy is a uniform policy applicable to a plurality of users.

15. A computer program product for processing a natural language query, the computer program product comprising computer executable code embodied in one or more non-transitory computer readable media that, when executing on one or more processors, performs the steps of:

receiving at an interface a natural language query from a user;

presenting a selectable visual representation to allow the user to select at least one document of a plurality of documents;

receiving an input from the user to select at least one document of the plurality of documents, wherein the input comprises activation of the at least one selectable visual representation;

referencing, using one or more processors executing instructions stored on memory, at least one policy associated with the user, wherein the at least one policy defines a permission for the user with respect to accessing a plurality of documents stored in a database;

restricting access to a first subset of the plurality of documents based on the policy associated with the user and the user selection of the at least one document such that only a second subset of the plurality of documents can be referenced to generate a response to the natural language query, wherein restricting access to the first subset of the plurality of documents further includes restricting access to metadata associated with a portion of the plurality of documents;

referencing the second subset of the plurality of documents to generate the response to the natural language query; and presenting via the interface the generated response to the user.

16. The system of claim 1 wherein the one or more processors restrict access to the first subset of the plurality of documents by redacting a portion of a document of the plurality of documents.

* * * * *